United States Patent [19]

Morrison

[11] Patent Number: 5,425,128
[45] Date of Patent: Jun. 13, 1995

[54] AUTOMATIC MANAGEMENT SYSTEM FOR SPEECH RECOGNITION PROCESSES

[75] Inventor: Robert L. Morrison, Tucson, Ariz.

[73] Assignee: Sunquest Information Systems, Inc., Tucson, Ariz.

[21] Appl. No.: 890,915

[22] Filed: May 29, 1992

[51] Int. Cl.⁶ .............................................. G10L 9/00
[52] U.S. Cl. .................................. 395/2.52; 395/2.66
[58] Field of Search ..................... 395/2.52, 2.53, 2.66, 395/2.55, 2.79, 2.84; 381/43

[56] References Cited

U.S. PATENT DOCUMENTS

| | | | |
|---|---|---|---|
| 4,363,102 | 12/1982 | Holmgren et al. | 364/513 |
| 4,454,586 | 6/1984 | Pirz et al. | 364/513.5 |
| 4,766,529 | 8/1988 | Nakano et al. | 395/2.84 |
| 4,769,844 | 9/1988 | Fujimoto et al. | 395/2.52 |
| 4,827,518 | 5/1989 | Feustel et al. | 381/42 |
| 4,827,520 | 5/1989 | Zeinstra | 395/2.52 |
| 4,864,622 | 9/1989 | Iida et al. | 381/41 |
| 4,922,538 | 5/1990 | Tchorzewski | 381/42 |

*Primary Examiner*—Allen R. MacDonald
*Assistant Examiner*—Michelle Doerrler
*Attorney, Agent, or Firm*—Cahill, Sutton & Thomas

[57] ABSTRACT

In a computer system including an input-output terminal and an application program having a vocabulary file of acceptable input words and keystroke characters associated with the input words, the vocabulary file and corresponding keystroke characters are automatically retrieved by an operator request through the action of a host application program. Prior to executing a speech recognition process, the retrieved vocabulary file and corresponding keystroke characters are automatically assembled by the same host application program into a syntax file according to syntax rules of a speech recognition program. The resulting vocabulary/syntax file then is compiled into a format useable by the speech recognition process program. The compiled vocabulary/syntax file is used to automatically prompt the operator to speak the various vocabulary words, causing an analog-to-digital conversion circuit to produce digital template codes that are assembled into a speech template file. The compiled vocabulary/syntax file and the speech template file are sent to and stored with the application program, and are automatically downloaded to the speech recognition program to effectuate speech-input execution of the host application program.

19 Claims, 3 Drawing Sheets

AUTOMATIC MANAGEMENT SYSTEM FOR SPEECH RECOGNITION PROCESSES

BACKGROUND OF THE INVENTION

The invention relates to a system for storing and automatically downloading vocabularies and speech templates from a host computer to a speech recognition station or process in response to a request by a particular operator for a particular sub-application, automatically generating new or updated vocabularies for new or updated sub-application requirements, and automatically generating corresponding new speech templates for an unenrolled operator.

Various speech recognition systems are known. The assignee's commercially marketed "INTELLiVOICE" speech recognition system is a speech entry system that operates as an accessory to a variety of specialized keyboard applications which permit either speech or keyboard entry of specific commands/keystrokes. Conventional speech recognition techniques are used to translate spoken words into keystrokes as an alternative to entering identical information by depressing a key.

The closest prior speech recognition systems require the basic elements of "speech templates" in combination with "syntax" programs. Speech templates, also referred to as "voiceprints", are required because each speaker has unique ways of saying particular words. Such unique ways are sufficiently different from the way another person speaks the same word that the only practical way (at the present state-of-the-art) of recognizing a spoken word is to compare an electronic representation of that spoken word (obtained by operating on the spoken word by known Fourier analysis techniques or the like to produce a digital representation of the word) with a previously digitized and stored voiceprint for that person. Storing such voiceprints for a vocabulary of words requires a great deal of memory.

A conventional technique for interpreting spoken speech commands is to utilize a "syntax" structure or program. A syntax structure or "grammar" is a program that prepares a "software construct" or software structure that defines which words are to be recognized and possible logical relationships between them. It is necessary to understand that each particular program or "application" or "sub-application" to be executed in response to a particular request has its own syntax.

Every application to be speech-accessed by various persons must utilize previously stored constructs that are specific to the presently desired application. These constructs consist of a syntax and all voiceprints of persons who are allowed to use speech to input information into the desired application program.

The most common so-called speech recognition systems presently available merely recognize spoken sounds, but make no attempt to interpret them. Spectral frequency content and timing information derived from the spoken sounds are used to create a table of unique codes that correspond to each sequence of sounds enunciated by the speaker. That table of codes is referred to as a speech template. Speech templates are required for every person who may input speech information to the system, since the spectral content, amplitude of each frequency component, and timing aspects for each component of enunciated sound are unique to each particular speaker.

In the closest prior art, voiceprint data and syntax information have been entered and stored at each speech recognition station. If, for example, a particular technician wishes to access a particular software operation or "process", for example to obtain results of a blood test for a patient in a hospital, the laboratory technician loads his voiceprint and the syntax information (both of which may be stored on a floppy disk that the laboratory technician carries with him) for the desired sub-application into the speech recognition station before his desired speech commands can be spoken. This technique has its shortcomings. Any time the "process" must be updated, for example to add new operators who can input speech requests, to add new vocabulary words that are acceptable to the syntax program, or to add new functions to an application or sub-application, it is necessary to update all of the data stored locally at each speech recognition station (or within each floppy disk). This manual process is inconvenient, time-consuming, and costly. It could also result in some systems or floppy disks being inadvertently missed. If floppy disks are employed, there is also the risk they will be lost.

To date, the use of speech recognition by a computer typically has involved an awkward combining of two distinct systems, a host computer and a speech recognition system. Little has been done in the prior art to automate the coordination of these two very different systems.

SUMMARY OF THE INVENTION

It is an object of the invention to provide a multi-application, multi-operator computer system capable of receiving speech input from various operators without the need for the operators to load speech templates, syntax information, or vocabulary information immediately before proceeding with speech command/requests to the computer.

It is another object of the invention to provide a computerized speech recognition system that automatically generates or updates vocabularies for new or updated user applications and automatically generates corresponding new or updated speech templates for previously unenrolled operators.

It is another object of the invention to avoid inadvertent use of non-updated vocabulary/syntax files in a speech recognition system.

It is another object of the invention to avoid the need for each operator to carry media storing his or her speech templates in order to speech-input information to a computer system with speech recognition capability.

Briefly described, and in accordance with one embodiment thereof, the invention provides a computer system including an input-output speech recognition station and a plurality of application programs each having a vocabulary file of acceptable input words and keystroke characters associated with the input words. An operator enters an operator identifier and an application program identifier into the computer system via a keyboard of the speech recognition station. A host computer responds by operating an application (or sub-application) program selected by the application program identifier that, in addition to its primary task, retrieves the appropriate syntax file and speech template files stored within the host computer and loads them into the speech recognition station. The syntax file is constructed earlier by assembling the vocabulary and corresponding keystroke characters associated with the present application according to syntax rules of a speech recognition program stored in the requesting speech recognition station.

When first used, the syntax file is compiled by means of a compiler associated with the speech recognition program to produce a compiled vocabulary file including the vocabulary words and keystroke codes selected from a keystroke code list associated with the application. When an operator first uses the system, the compiled vocabulary file is used to prompt the operator to speak the various vocabulary words as part of an operator enrollment process. An analog-to-digital conversion circuit operates on the analog signals produced in response to the spoken vocabulary words to produce a digital signal representing the spoken words, to produce therefrom a speech template file containing digital template codes corresponding to the various vocabulary words. The compiled vocabulary file and the speech template file then are transmitted to and stored with the application program. The compiled vocabulary file and the speech template file then are downloaded to the speech recognition program to enable the operator to speech-input spoken words of the compiled vocabulary file to effectuate execution of the application program.

DETAILED DESCRIPTION OF THE PREFERRED EMBODIMENTS

Figure 1:
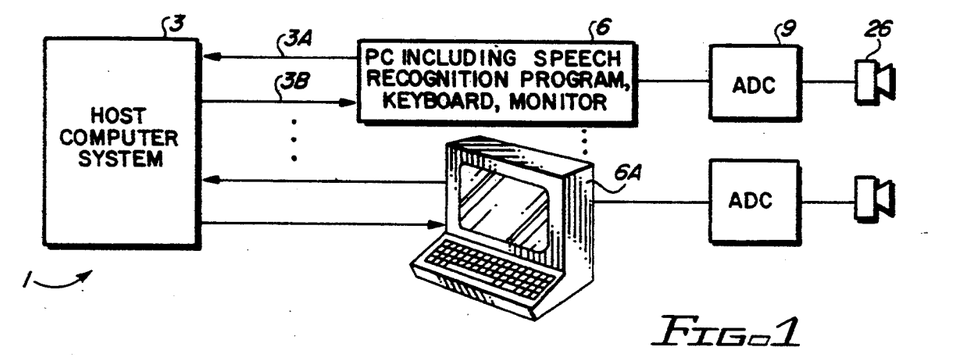
FIG. 1 is a simplified block diagram of the speech recognition/computer system of the present invention.

FIG. 1 shows a system 1 including a host computer or computer system 3 that is connected to one or more input/display terminals such as 6 and 6A by a bus 3A,3B. In the described embodiment of the invention, each terminal such as 6 or 6A includes a speech recognition system. Each speech recognition station such as 6 can be associated with a personal computer (PC), such as an IBM PS/2. It should be understood that the speech recognition system, which can be a commercially available speech recognition system such as a DRAGONWRITER 1000, marketed by Dragon Systems, Inc. of Newton, Mass., includes a software program that can be stored entirely (or partly) in personal computer 6. The speech recognition system also includes analog-to-digital conversion hardware that is connected to the internal digital data bus of personal computer 6. The personal computer and speech recognition system associated therewith hereinafter will be referred to as speech recognition station 6. (It is to be understood that the term "speech recognition station" refers to a system that includes hardware which typically includes analog-to-digital conversion circuitry and processing hardware such as the above-mentioned personal computer along with speech recognition software.)

Software for generating characters that the sub-application routines in host computer 3 can understand in response to operator speech utterances is included in the speech recognition system program. Software that conducts the enrollment or training process for first time users to produce speech templates also is included in the speech recognition program.

A program referred to as the "Laboratory Information System" software is stored in host computer 3. The assignee presently markets such software under that name. The present invention includes development of a similar system to incorporate speech recognition capability. The Laboratory Information System software (hereinafter occasionally referred to simply as "the program") performs most or all of the data management tasks that are required in a modern medical laboratory and eliminates all or most of the paperwork involved in documenting laboratory activities, and is used in recording all of the laboratory work occurring in the medical laboratory for each particular patient. The Laboratory Information System software also records and reports all of the results arising from a particular laboratory operation, such as the processing of a urine specimen and generating a comprehensive report for the ordering physician. The program also includes ancillary functions pertaining to management of the data, quality control, etc. Other examples of use of the Laboratory Information System software include autopsy reports, reports on the pathology of a slide, etc. It can be thought of as an application program containing a number of sub-application programs. Each part of the program that effectuates entry of laboratory results can be referred to as a sub-application of the larger application program. The host computer 3 is a multi-user system, so many such sub-applications can be operated simultaneously.

One function of the present invention is to automatically produce vocabularies from information contained in a specific sub-application. An example of a specific sub-application is one that effectuates inputting of data results from urology examinations. Each sub-application has its own required list of vocabulary words that can be input either by a terminal keyboard or by performing a speech recognition process on speech utterances. Electronic recognition of speech utterances is particularly useful in allowing a laboratory technician to verbally input observations made from an evaluation or analysis etc. For example, for a urine analysis, the laboratory technician can speak certain words instead of performing keystrokes to input his or her observation of the color or other characteristics of the urine. Such spoken words can be "red" "yellow", "green", etc. indicating various medical conditions of the patient.

The term "syntax" as used herein refers to a software structure that accepts limited responses to the prompting for entry of information (in this case, speech input of words) that is very restricted. For example, in the above urine analysis technique, the recognition process will be limited to words describing color when the technician is prompted to speech-enter only the color of the urine. The program thus creates a structure within the speech recognition process to create a syntax which makes only limited options such as color available at the appropriate time for speech-input of words to the speech recognition process. The term "syntax" is used herein interchangeably with the term "grammar".

The automatic speech recognition management system of the present invention includes automatic vocabulary-producing software that "knows" the limited appropriate responses to the prompting by a particular sub-application (such as a urology examination or a cytology pap smear examination).

The vocabulary producing software included in the automatic speech recognition management program can look at the sub-application, extract the words (uncompiled vocabulary file) that are involved in executing that sub-application, and compile a syntax file that is understandable by a computer in the speech recognition system program that is being used in personal computer 6. The automatic vocabulary producing software not only produces a list of appropriate acceptable speech-input observation words, but also provides a syntax mechanism for logically switching among the permissible words in the speech recognition system, depending upon useage. (For example, if the operator is to input information regarding the color of a patient's eyes, the syntax must exclude all words other than the permissible responses such as "black", "blue", "brown", "green", etc.) The outcome of the speech recognition process then is to generate a sequence of digital "keystroke codes" that are identical to those that would be produced if the operator were entering the observations by means of a keyboard instead of speech-inputting them.

The automatic speech recognition management system of the present invention stores the vocabulary files and corresponding syntax files for each particular sub-application, and provides them on demand to the speech recognition program associated with the requesting speech recognition station.

More specifically, the automatic speech recognition management system of the present invention has the capability of automatically transferring appropriate vocabulary/syntax files and user speech template files to the requesting speech recognition station in response to selection by a particular operator of a particular sub-application. The automatic speech recognition management system also automatically prompts the speech recognition system to perform its above-mentioned enrollment or user training functions to produce user speech template files for that operator if the speech template files needed have not all been previously generated or updated.

Computer bus 3A carries operator identification and requested sub-application identification information from personal computer 6 to host computer 3, which then downloads the necessary compiled vocabulary file and speech template file (if they exist and include any updates to the uncompiled vocabulary file) for the present operator and the requested sub-application via bus 3B. The speech recognition system program being executed by personal computer 6 then has all it needs to perform the speech recognition function in response to prompted utterances by the operator, and, in response to the utterances, generates the same "keystroke" codes that would be generated in response to keyboard entries if speech recognition systems were not being used. Personal computer 6 then transmits the keystroke codes along bus 3A to host computer 3 so that the sub-application software can perform its pre-established function.

It should be understood that personal computer 6, with both a conventional terminal emulator subroutine and a conventional speech recognition system program loaded therein, appears to host computer 3 as a "dumb" terminal, because the information it receives via path 3A in response to user inputs merely consists of ordinary keystroke information for inputting information to the Laboratory Information System program.

The operator log-on information and sub-application request information are input to the Laboratory Information System program in host computer 3 via the keyboard of personal computer 6, regardless of whether the speech recognition system is used. The operator first identifies himself using the keyboard. The operator then identifies which function, i.e., which sub-application, is desired. From this information, and with knowledge of the incoming path, host computer 3 then recognizes that the request is being made from a terminal or personal computer capable of either speech recognition or keyboard information entry. It should be understood that the host processor stores a map that identifies the locations or path connections of all terminals which have speech recognition capability.

Host computer 3 recognizes that the requested sub-application is capable of operating with speech input and has associated with it a compiled sub-application vocabulary file and corresponding speech template files for the identified operator if he has previously enrolled. If the request was entered from a speech station, host computer 3 then prompts the requesting operator to select speech-input mode operation. If the operator selects the speech-input operator mode, host computer 3 then sends the sub-application vocabulary files and the corresponding pre-established operator speech template files to a speech recognition system program in personal computer 6. If the host computer does not have all of the speech templates required for the present operator, then it sends a command to the speech recognition system program in personal computer 6 to cause it to generate the needed speech templates for the present operator for the selected sub-application. When those speech templates are created, they are transmitted back to the host computer and stored with the application compiled vocabulary. This process is explained in more detail with reference to FIGS. 2A and 2B.

Figure 2A:
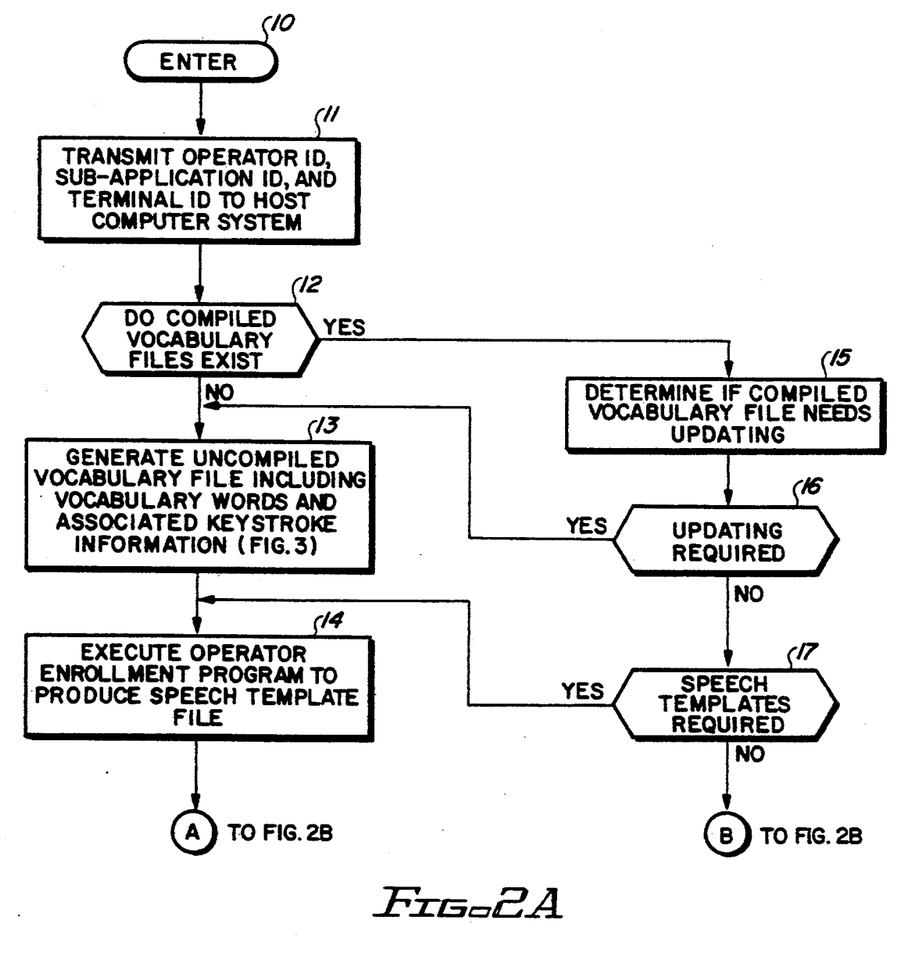
FIGS. 2A and 2B constitute a flowchart of the speech recognition management system executed by the system of FIG. 1.
Figure 2B:
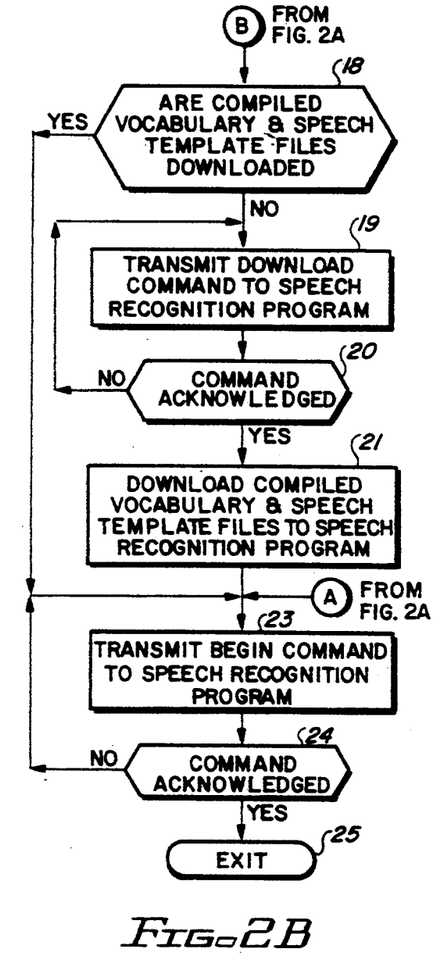

The flowchart of the automatic speech recognition management system program shown in FIGS. 2A and 2B is executed by host computer 3 as follows. It is assumed that the requesting operator already has logged into the Laboratory Information System program by means of personal computer 6 and has selected the desired sub-application. It also is assumed that host computer 3 has recognized that the requested sub-application has the capability to support speech input of observed information.

If the operator has selected the speech-input option, block 11 of FIG. 2A is entered via label 10. In block 11, host computer 3 passes the log-on information, including the identity of the operator, the identity of the requested sub-application, and the location or identification of the personal computer 3 to the automatic voice recognition management program. The subroutine implementation of block 11 is straight-forward and is stored with or as part of the sub-application software in host computer 3.

The automatic speech recognition management program then enters decision block 12 and determines if compiled speech vocabulary files exist for the requested sub-application and the requested operator.

If the present operator has never requested the present sub-application before, the determination of decision block 12 is negative because the compiled speech vocabulary files of the requesting operator have never been stored with the selected sub-application. The program therefore goes to blocks 13 and 14 and produces the necessary compiled vocabulary file and speech template file for the selected sub-application and the present operator, as described in more detail with reference to FIGS. 3 and 5.

Usually there is an affirmative determination in decision block 12, because most requests by an operator will not be the first request by that operator. In a usual case, the speech recognition management program goes to block 15 and obtains the state of an internal, user-specific flag associated with the selected sub-application to determine if the compiled speech vocabulary files need to be updated. The automatic speech recognition management program then goes to decision block 16 and determines if updating of the compiled vocabulary files for the selected application is necessary. This determination is made by referring to the above-mentioned flag, which is automatically set whenever someone updates the vocabulary of the present sub-application. If the selected sub-application has been modified so that its compiled vocabulary file is not up-to-date, then an affirmative decision is obtained from decision block 16, so the program goes to block 13 to update the compiled vocabulary files.

If no updating of the vocabulary file for the requesting operator has been performed since the last time it was referenced, the automatic speech recognition management program goes to decision block 17 to determine if speech template files are needed for the present requesting operator. If this determination is negative, the program goes to block 18 of FIG. 2B and determines if the desired compiled vocabulary file and speech template file already have been downloaded into the automatic speech recognition program in personal computer 6.

Figure 4:
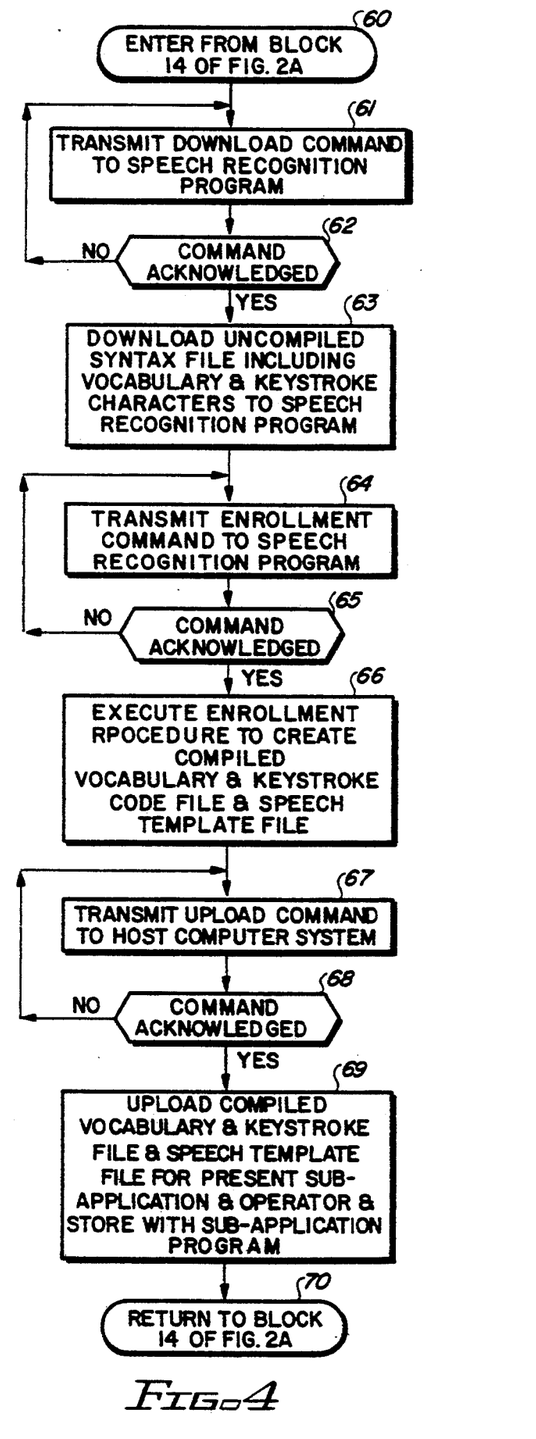
FIG. 4 is a flowchart of the routine executed in block 14 of FIG. 2A.

If the determination of decision block 17 is affirmative the program goes to block 14 and executes the enrollment procedure of FIG. 4 to produce the needed speech template for the present operator and requested sub-application. Block 14 also is entered from block 13 because if a new vocabulary file needs to be created or a present vocabulary file needs to be updated, new speech templates will be required for every authorized operator to effectuate execution of the new or updated functions of the selected sub-application.

If the desired compiled vocabulary file and speech template file are already loaded into the automatic speech recognition management program, the determination of decision block 18 in FIG. 2B is affirmative. The program then goes to block 23 and sends a command to cause the speech recognition system to begin the speech recognition process.

If the compiled vocabulary file and speech template file have not already been loaded into the automatic speech recognition management program, the determination of decision block 18 is negative, and the program goes to block 19 and transmits a download command to the speech recognition system program in personal computer 6 to cause it to receive the requested compiled vocabulary files and associated speech template files. When the speech recognition system program in personal computer 6 is ready to receive the files, it sends an acknowledgement signal to host computer 3. If that acknowledgement has been received, the determination of decision block 20 is affirmative and the program goes to block 21 and executes a subroutine that transmits the requested compiled vocabulary file and speech template file to the speech recognition system program in personal computer 6. The program then goes to block 23, previously described.

After an acknowledgement has been received from the speech recognition system in personal computer 6 indicating the speech recognition process can begin, the program goes to block 25 and exits the automatic speech recognition management program, and the speech recognition process of converting operator utterances into keystroke codes and transmitting them to the selected sub-application program in host computer 3 begins.

Figure 3:
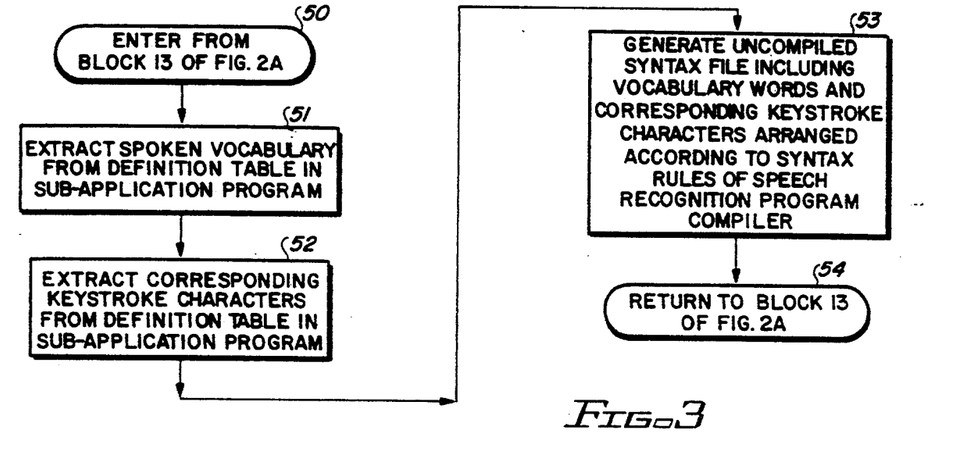
FIG. 3 is a block diagram of the routine executed in block 13 of FIG. 2A.

FIG. 3 shows a simplified flowchart of the algorithm of block 13 in FIG. 2A in which the vocabulary file for the selected sub-application required by the speech recognition system is produced, if necessary. In block 51 of FIG. 3 the program extracts from the selected sub-application database or "definition table" the uncompiled spoken vocabulary words that are needed to effectuate operation of the selected application function. This definition table includes "keystroke characters" related to what the selected sub-application expects in response to each particular word uttered by the operator. Both the keystroke characters and the spoken words corresponding to each function of the requested sub-application are collected from the definition table of the selected sub-application, as shown in blocks 51 and 52 in FIG. 3.

That information is used in block 53, in which the program produces the "syntax" file needed by the compiler of the speech recognition system program in accordance with its syntax rules. The subroutine represented by block 53 uses conventional auto-encoder techniques that perform the function of producing a program from the data received from block 52 in accordance with the speech recognition system syntax rules, as subsequently explained in more detail with reference to FIG. 5.

FIG. 4 shows a detailed flowchart of the operator enrollment procedure of blocks 13 and 14 of FIG. 2A to produce the compiled vocabulary and speech template files for the selected sub-application for the present operator.

When block 61 of FIG. 4 is entered via label 60, the first function performed is to transmit a command via a conventional terminal emulator program to a portion of the automatic speech recognition management program that is stored in personal computer 6 to prepare it to receive the required vocabulary file from host computer 3. When an acknowledgement has been received by host computer 3 that the portion of the automatic speech recognition management program in personal computer 6 is ready to receive the uncompiled vocabulary/syntax file, an affirmative decision is produced in personal computer 6, indicated in decision block 62. The portion of the automatic speech recognition management program in host computer 3 then goes to block 63 and transmits the uncompiled vocabulary/syntax file from host computer 3 to the portion of the automatic speech recognition management program in personal computer 6, as indicated in block 63. The program then goes to block 64 and transmits a command to the speech recognition system program to place it in its enrollment mode. After an appropriate acknowledgement of this has been received from the portion of the automatic speech recognition management program in personal computer 6 as indicated by an affirmative determination of decision block 65, the portion of the automatic speech recognition management program in host computer 3 goes to block 66 and causes the speech recognition system program to perform its enrollment process for the present sub-application and the present operator to thereby create the needed compiled vocabulary/syntax file and speech template file. This file generation procedure is performed by software which is included in the above-mentioned conventional speech recognition system program executed by personal computer 6. All control of this program occurs through the action of the portion of the automatic speech recognition management program in personal computer 6 working in conjunction with a conventional terminal emulator program.

When that enrollment has been completed, the needed compiled vocabulary/syntax and speech template file or files have been produced. The portion of the automatic speech recognition management program in personal computer 6 goes to block 67 and transmits an upload command to the portion of the automatic speech recognition management program in host computer 3 to prepare for uploading of the speech template file and the compiled vocabulary file. When host computer 3 has acknowledged the present request, as indicated by an affirmative output of decision block 68, the portion of the automatic speech recognition management program in personal computer 6 then uploads the compiled vocabulary file and the speech template file to the portion of the automatic speech recognition management program in host computer 3, which receives and stores the speech template file as indicated in block 69. The program then goes via label 70 of FIG. 4 to block 23 of FIG. 2B.

As previously indicated, each sub-application included in the sub-application software includes its own database or "definition table" which includes (and may be periodically updated to further include) all spoken words that are permissible for speech input. That list of acceptable speech words constitutes the uncompiled vocabulary file for that sub-application. The definition table or database also includes all of the keystroke characters which the sub-application software expects to receive in response to speech-input of the various vocabulary words. Those keystrokes are the same keystrokes that would be performed by the operator by typing them into the keyboard if the speech-input mode is not selected by the operator.

Figure 5:
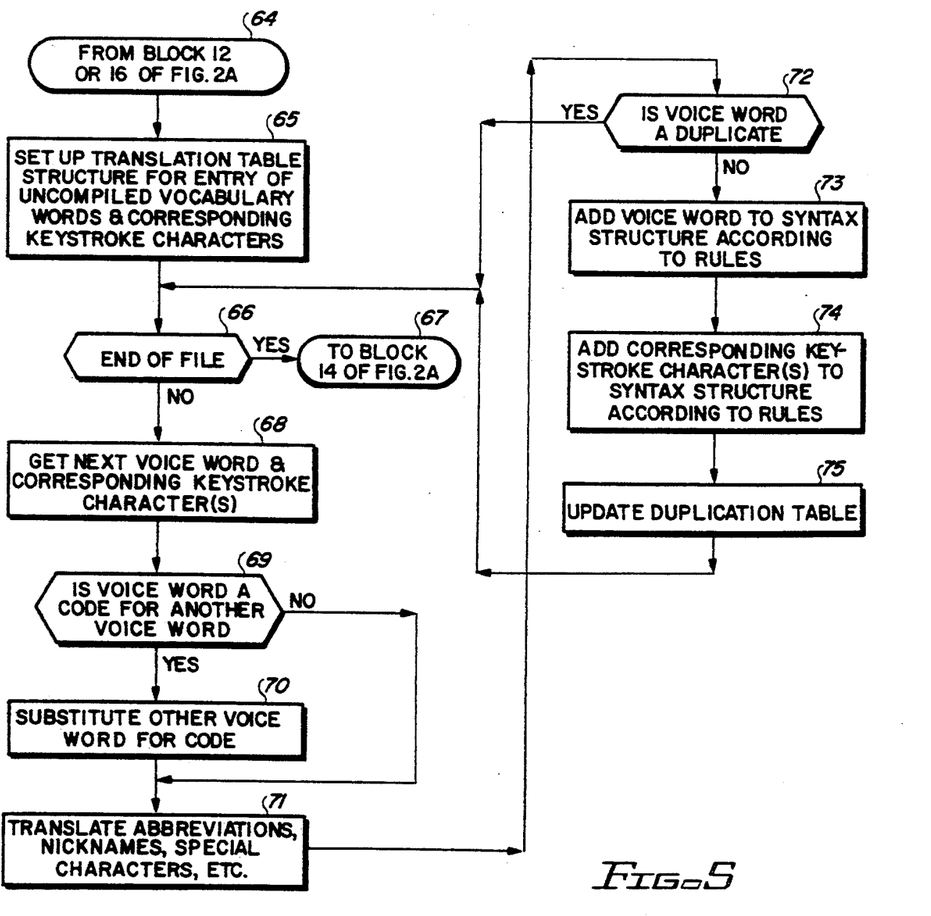
FIG. 5 is a detailed flowchart of the vocabulary producing program of FIG. 3.

The program as shown briefly in FIG. 3 and in more detail in FIG. 5 automatically goes through the definition file or database of the selected sub-application and extracts the needed vocabulary words and corresponding keystroke characters to be generated in response thereto and assembles that information according to a set of syntax rules into a form that can be compiled by a compiler stored in the speech recognition system program. The compiled vocabulary file then is uploaded back to host computer 3 and stored as a compiled sub-application vocabulary file which then can be downloaded back to the speech recognition system program in personal computer 6 after enrollment of the requesting operator. A program named VOCL in the above-mentioned DRAGONWRITER 1000 speech recognition system enrolls the present operator by prompting him to speak the various compiled vocabulary words, and generates speech template codes that are correlated to the keystroke codes of the keystroke characters associated with the respective spoken words. The resulting speech templates and the compiled vocabulary file then are uploaded to the host computer 3 and stored with the sub-application software.

Then the compiled vocabulary/syntax file, the speech template file (which is used by the speech recognition program to recognize the spoken words), and the keystroke codes contained in the compiled vocabulary/syntax file (which are used to transmit the spoken and recognized words to the sub-application program) for the present operator can be downloaded the next time the enrolled operator wishes to access the sub-application.

Referring to FIG. 5, the program enters block 65 via label 64, and a translation table is established to contain 1) each of the uncompiled vocabulary words to be recognized when enunciated by the operator, and 2) the keystroke characters for which keystroke codes are to be generated by the speech recognition system in response to speech input of various vocabulary words.

The program then goes to decision block 66 to determine if the end of the source database file has been reached. An affirmative determination causes the routine of FIG. 5 to be exited, and the program returns via label 67 to block 14 of FIG. 2A.

However, if the end of the source database file has not been reached, the program goes to block 68 and the present keystroke character and its associated description (for example, the word "default" could be translated to a tilde, the word "normal" could be translated to a "0", the word "yes" could be translated into "Y", etc.) are retrieved from the source database keyboard definition file stored in the keyboard definition software associated with personal computer 6. Stated differently, in block 68, the present vocabulary word which has been retrieved from the source database file in the sub-application software is associated with a keyboard character which is to be produced in response to the enunciation of that speech description word when enunciated by the operator.

The program then goes to decision block 69 to determine if the speech description word is a code for a description stored in another file. (Because of application demands unrelated to the speech recognition process, some sub-application vocabularies may be complex, and require steps similar to those shown in Blocks 69 through 71.) If this determination is affirmative, the program goes to block 70, fetches the "text" description word from the other file, and then goes to block 71. If the determination of decision block 69 is negative, the program goes directly to block 71. In block 71 the program translates any "special characters" (such as abbreviations or nicknames for long or difficult-to-pronounce words) that are in the text description.

At this point, part or all of an uncompiled vocabulary file associating speech input words to expected corresponding keyboard characters has been extracted from the source database vocabulary file stored with the sub-application software and inserted into the translation table being constructed. The program then goes to decision block 72 and compares the present entry of that table to an ancillary table to determine if the present speech description word has been previously used. If it has, program control is transferred to block 66, but otherwise the program goes to block 73.

In blocks 73, 74, and 75 the syntax rules required by the compiler of the commercially available speech recognition program are utilized to assemble the table being constructed into a form that can be operated upon by the compiler. In block 73, each speech description word is added to the required syntax structure, and in block 74, the corresponding keystroke character definition also is added to the required syntax structure. In block 75, both the description word and the keystroke definition are added to the ancillary table referred to in decision block 72. The program then returns to decision block 66 to determine if the entire vocabulary word-/key character file has been assembled in a format acceptable to the compiler.

In the appendix, the subject matter of FIG. 2A, blocks 11, 12, 15, 16, and 17 appears on page 2, line 660 to page 4, line 1760. The subject matter of blocks 13 and 14 of FIG. 2A, which encompasses the flowcharts of FIGS. 4 and 5, are shown in page 4, line 1920 to page 5, line 2720 (FIG. 4) and page 6, line 0 to page 8, line 1220 (part of FIG. 4 and all of FIG. 5). The appendix submitted herewith includes source code in the language MUMPS corresponding to the flowcharts of FIGS. 2A, 2B, and 3-5.

The above-described speech recognition management program avoids the above-mentioned problem of ensuring that each operator always has access to the most recently updated vocabulary/syntax files and speech recognition template files. The invention also avoids the need for each operator to carry such files on a floppy disk. Furthermore, the invention automates the operation of known speech recognition processes by providing a system in which the requesting operator merely needs to follow prompting instructions on the screen of the speech recognition station, with no prior knowledge of how to operate the speech recognition process.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, some speech recognition systems do not require speech templates to be created and stored for each requesting operator, but may require additional information about the present user, the present application, or the present environment in order to properly interpret words spoken by the operator. The present invention allows automatic collection of such information and use of it to interpret recently spoken words. For example, even in computer systems that include speech recognition systems which are relatively "independent" of the particular speaker for inputting of information to a desired application program, it is necessary for the computing system to include various files that relate to the particular application programs to be executed and to the particular operators that are allowed to access the various application programs and voice-input information thereto. In such computing systems, even those including speech recognition systems that are adaptive in nature, there is a need to have an automatic speech recognition management system to retrieve the necessary application-related files and the necessary operator-related files needed to effectuate voice-input by the present requesting operator into the desired application program. The above-described invention accomplishes this objective. It should be appreciated that although the analog-to-digital conversion hardware required to convert operator utterances into digital codes usually would be connected to the speech recognition station of personal computer 6, this conversion hardware and the speech recognition system software in the future may be more economically located in the host computer 3, as the technology progresses. Although the "speech recognition station" described herein is a personal computer such as an IBM P/S2, any computer or similar equipment separate from the host computer can perform this role, and the term "personal computer" is intended to encompass any such separate system.

APPENDIX

H 7 1 T (PGM)

isting from: QADEVS43,SMP
equested by: DLK (David L. Kilian-2300)
printed: 05/04/92 9:23a

```
       H71T    ; Last change: Jan 23 92, 13:59:18 (DLK#VTA2325:) / Last file: Jan 23 92, 13:59:18 (DLK#VTA2325:)
1C              ; the Dragon System voice input software.
20              ; . does the following:
30              ;
40              ; 1 - constructs source files for the Dragon System
50              ; 2 - downloads source files if necessary
60              ; 3 - downloads object and voiceprint files for Dragon System
70              ; 4 - uploads object and voiceprint files
80              ;     and stores them in ^LBI(71,FNM,3,TC)
90              ;
100             ; The "source file" is a specially formatted ascii file that the
110             ; Dragon System can compile to run a voice application. The
120             ; "object file" is produced by Dragon software and contains
130             ; the compiled source file. The "voiceprint file" is produced
140             ; by the Dragon System when a user trains the system.
150             ;
160             ; The source file has four basic components. The first two
170             ; define a hierarchy of terms and the third define individual terms.
180             ; The 1st begins with "ROOT=" and is followed by a list of
190             ; hierarchy terms delimited with commas:
200             ;    "ROOT=T1,T2,...,Tn;"
210             ; The 2nd defines components of hierarchy terms:
220             ;    "T1=ACCEPT,MODIFY,...n;"
230             ; The 3rd defines individual terms:
240             ;    "ACCEPT   "A";"
250             ; Cuts the quotes in above examples are not included in source file.
260             ; The fourth component includes miscelaneous commands, such as
270             ; those to define sleep states and control a tape recorder. These
280             ; are formatted in the global ready to download.
```

```
290             ;
300             ; A source file only needs to be downloaded under the following
310             ; circumstances:
320             ;  - the source file is new or has been modified (i.e. the keyboard
330             ;      is new or has been modified)
                ;  - the user has never trained the keyboard
350             ;
360             ; To re-train a keyboard, the object and voiceprint files needs
370             ;     to be downloaded.
380             ;
390             ; Object and voiceprint files produced by the Dragon System are
400             ;    binary coded. Before they are uploaded they are translated
410             ;    to ascii codes. When downloaded, they are retranslated to binary.
420             ;    The object and voiceprint files are stored in the same ^LBI(71)
430             ;    structure with a separator line (containing the string "ADIOS").
440             ;
450             ; The upload process begins immediately after download has completed.
460             ; That is, it issues an immediate read with a timeout. If the file
470             ; does not begin to arrive within 8 hours, it will time out.
480             ;
490             ; Any interaction with the voice system is initiated by writing
500             ; a ^A ($C(01),"EX KERRECV.SCR",$C(13)). When RELAY receives this,
510             ; it will respond by sending an "OK". Once this is received by this
                ; routine, a parameter will be sent to the RELAY script file to tell
530             ; it what function to execute. These codes are as follows:

"1" = download an object and vp file, no further action
560             ;   "2" = download a source file, initiate training, upload object
570             ;           and vp file
580                         download an object and vp file and download a source file,
                                initiate training, upload object and vp file
600                 "4"     download nothing, initiate training, upload object and vp file
610             ;
620             ; Completion of download is indicated to script file by sending
630             ; an "ADIOS". The imbedded "ADIOS" in the object/vp files is
640             ; used by the script file differentiate files.
650             ;
660     TV      ;
670             ; Train voice option
680             W @CS,"Lab Maintenance - TRAIN VOICE INPUT FUNCTION"
690             ;
700             ; Prompt for tech code and keyboard, execute download and upload
710             S Q=0
720             D:TC="" ^TECH Q:Q!(TC="") I TC["-" S TC=$P(TC,"-",1) W !,"Using tech code ",TC,!
730             D KB Q:Q
740             D MAIN
750             Q
760             ;
770     KB      ;
780             ; Prompt for keyboard to train
790             S Q=1
800             W !!,"KEYBOARD:",?20 R R Q:"*"[R
810             I R?1"??".E D KB1 G KB
820                ??1"?".E S %DS="M71T KB" D ^QHLP G KB
                   .E1C.E W ^LBI(16,285) G KB
840             I R'?1U.UN W " INVALID ENTRY" G KB
850             I '$D(^LBI(71,"PROC-"_R)) W " KEYBOARD NOT DEFINED" G KB
860             S FNM="PROC-"_R,Q=0
870             Q
880             ;
890     KB1     ;
900             ; Display list of keyboards
910                "eyboard list:"
920             S X="PROC-" F Z=0:0 S X=$O(^LBI(71,X)) Q:X'["PROC-" W !,?5,$P(X,"-",2)
930             Q
940             ;
950     MAIN    ;
960             ; Main line of the program
970             W !!,"Initializing Voice System...",!!
980             ; Check for assigned number for tech code/ keyboard combo
990             I '$D(^LBI(11,TC,"VOICE",FNM)) D ASSIGN Q
1000            ;
1010            S FILENO=^LBI(11,TC,"VOICE",FNM)
1020            ; First determine whether to download source file. If the time
1030            ; stamp on the keyboard definition is later than the time stamp
1040            ; on the voiceprint file, it should be downloaded.
1050            S KTM=$P(^LBI(71,FNM),D1,3),KTM=$TR(KTM,CM,"")
1060            S TTM="" I $D(^LBI(71,FNM,3,TC))#10 S TTM=$P(^(TC),D1,1),TTM=$TR(TTM,CM,"")
1070            ;
1080            ; Check keyboard time against training time
                    .I'>TTM D GETCTL Q
1100            ;
```

```
                ; create source vocabulary file (.LAN)
                ;      .A71T1
1130            ;
1140            ; Download object file if it exists
1150            I ^TM'-'" D COF^H71T1,DOSF,UL K ^TPO(DV) Q
1160            ;
1170            ; Download source only
1180            D DSF K ^TPO(DV) D UL
1190            Q
1200            ;
1210   ASSIGN   ;
1220            ; Assign next file number to this tech code/keyboard combo
1230            S FILENO=$G($P(^LBI(11),D1,2))+1,$P(^LBI(11),D1,2)=FILENO,^LBI(11,TC,"VOICE",FNM)=FILENO
1240            S FILENO=FILENO
1250            ;
1260            ; Create source vocabulary file and send it
1270            D CSF^H71T1,DSF K ^TPO(DV)
1280            ;
1290            ; Wait for upload of voice training
1300            D UL
1310            Q
1320            ;
1330   FETCH    ;
1340            ;
1350            S XPRE="W $C(13),$C(01),"_QT_"RECVFILE "_QT_",FSPEC,"_QT_" NOBACKUP"_QT_",$C(13)"
1360            ;
1370            ; Wakeup RELAY script file and wait for response
1380            S Q=0 W $C(13),$C(01),"EX KERTRAIN.SCR",$C(13) R R:10 I R'="OK" W !!,"UNSUCCESSFUL WAKEUP OF VOICE SYSTEM" H 2 S Q=
1390            ;
1400            ; Get the date control record from the PC
1410            ; Set file number to use
1420            S ^TPO(DV,9,1)=FILENO
1430            ;
1440            ; Signal the script file to continue
1450            W "5",$C(13)
1460            ;
1470            ; Upload file number file
1480            S XF="^TPO("_DV_",9)"
1490            D ENT^LCO("S","LASTUSER.DAT",XPRE,"",XF,"","","","")
1500            ;
1510            ; Wait for verification of file existence
1520            S TIMO=0
1530            ;
1540            ; The process is waiting for a signal from the PC that it is
1550            ; done and back in touch
1560            S XF="^TPO("_DV_",8)",XPC=FILENO_".SIS"
1570            D ENT^LCO("R",XPC,"","",XF,"","","","")
1580            ;
1590            S R=^TPO(DV,8,1)
1600            ;
1610            I TIMO S %M="FILE VERIFICATION NOT RECEIVED. PROCESS TIMEOUT AFTER 5 minutes" D HMSG^ERR Q
1620            ;
1630            ; If the date control file doesn't exist send down what we have
1640            I R="INVALID" D COF^H71T1,DOF,UL K 'TPO(DV) Q
1650            ;
1660            S R=$TR(R,CM,"")
1670            ; If the date control file doesn't match the voice file
1680            ; send down what we have
1690            I R'=TTM D COF^H71T1,DOF,UL K ^TPO(DV) Q
1700            ;
1710            ; Signal the script file to continue
1720            W "6",$C(13)
1730            D UL
1740            ;
1750            Q
1760            ;
1770   DOF      ;
1780            ; Download object and voiceprint files
1790            ;
1800            ; Send code to initiate acceptance of object and vp file and download
1810            W "7",!
1820            ;
1830            ; Download object file
1840            S XF="^TPO("_DV_",2)"
1850            D ENT^LCO("S","VOCAB.ASC",XPRE,"",XF,"","","","")
1860            ;
1870            ; Download voiceprint file
1880            S XF="^TPO("_DV_",3)"
1890            D ENT^LCO("S","VOCA.ASC",XPRE,"",XF,"","","","")
1900            ;
```

```
1910                    Q
1920            ;___________________________________________________________
1930    DSF     ;
1940            ; Download source file
1950            ;
1960            S XPRE="W $C(13),$C(01),"_QT_"RECVFILE "_QT_",FSPEC,"_QT_" NOBACKUP"_QT_",$C(13)"
1970            ;
1980            ; Wakeup RELAY script file and wait for response
1990            S Q=0 W $C(13),$C(01),"EX KERTRAIN.SCR",$C(13) R R:10 I R'="OK" W !!,"UNSUCCESSFUL WAKEUP OF VOICE SYSTEM" H 2 S Q=
                1 Q
2000            ;
2010            ; Send code to initiate acceptance of source file and download
2020            W "1",!
2030            ;
2040            ; Download source file
2050            S XF="^TPO("_DV_",1)"
2060            D ENT^LCO("S","VOCAB.LAN",XPRE,"",XF,"","","","")
2070            ;
2080            Q
2090            ;
2100    DOSF    ;
2110            S XPRE="W $C(13),$C(01),"_QT_"RECVFILE "_QT_",FSPEC,"_QT_" NOBACKUP"_QT_",$C(13)"
2120            ;
2130            ; Wakeup RELAY script file and wait for response
2140            S Q=0 W $C(13),$C(01),"EX KERTRAIN.SCR",$C(13) R R:10 I R'="OK" W !!,"UNSUCCESSFUL WAKEUP OF VOICE SYSTEM" H 2 S Q=
                1 Q
2150            ;
2160            ; Send code to initiate acceptance of object and vp file and download
2170            W "2",!
2180            ;
2190            ; Download source file
2200            S XF="^TPO("_DV_",1)"
2210            D ENT^LCO("S","VOCAB.LAN",XPRE,"",XF,"","","","")
2220            ;
2230            ; Download voiceprint file
2240            S XF="^TPO("_DV_",3)"
2250            D ENT^LCO("S","VOCA.ASC",XPRE,"",XF,"","","","")
2260            ;
2270            ;
2280            ;
2290    UL      ;
2300            ; Upload object file
2310            S TIMO=0
2320            ;
2330            ; The process is waiting for a signal from the PC that it is
2340            ; done and back in touch
2350            R R:28800 I '$T S TIMO=1
2360            I R'="OK" S TIMO=1
2370            ;
2380            I TIMO S XM=$S(TIMO=1:"LASTUSER FILE NOT RECEIVED. PROCESS TIMEOUT AFTER 8 hrs.",TIMO=2:"TECH CODE/KEYBOARD("_SP(R,
                D1,1)_" "_SP(R,D1,2)_") DO NOT MATCH SELECTED CRITERIA("_TC_" "_FNM_"). NOT UPLOADED.",1:"TIMO="_TIMO) D HMSG^ERR W
                "6",$C(13) Q
2390            ;
2400            ; Signal the script file to continue
2410            W "3",$C(13)
2420            ;
2430            ; Set preamble and file name
2440            S XPRE=""
2450            S XF="^LBI(71,"_QT_FNM_QT_",3,"_TC_")",XPC="VOCAB.DAT"
2460            ;
2470            ; Initiate Kermit
2480            E^T^LCO("R",XPC,XPRE,"",XF,"","","","")
2490            ;
2500            ; If an error in KERMIT stop the script file and quit
2510            I E W "9",$C(13) Q
2520            ;
2530            S XPRE="W $C(13),$C(01),"_QT_"RECVFILE "_QT_",FSPEC,"_QT_" NOBACKUP"_QT_",$C(13)"
2540            ; Set file number to use
2550            S ^TPO(DV,9,1)=FILENO
2560            ;
2570            ; Set date updated
2580            S ^TPO(DV,0,1)=$H,^LBI(71,FNM,3,TC)=^TPO(DV,0,1)
2590            S FILENM=FILENO_".SIS"
2600            ;
2610            ; Signal the script file to continue
2620            W "4",$C(13)
2630            ;
2640            ; Download file number file
2650            S XF="^TPO("_DV_",9)"
2660            D ENT^LCO("S","LASTUSER.DAT",XPRE,"",XF,"","","","")
2670            ;
2680            ; Download date file
```

```
2690            S XF=""^TPO("_DV_",0)"
2700            D ENT^LCO("S",FILENM,XPRE,"",XF,"","","","")
2710            ;
2720            Q

0       M71T1   ; Last change: Mar 06 92, 10:25:59 (DLK#VTA886:) / Last file: Mar 06 92, 10:25:59 (DLK#VTA886:)
10              ; ... voice input software.
20              ; ... size of ^M71T
30
40              ;
50              ; Construct source file (.LAN) in ^TPO(DV,1)
60              ; The source file will be built in ^TPO(DV):
70              ;     ^TPO(DV,1) = root of term hierarchies
80              ;     ^TPO(DV,2) = definition of root terms
90              ;     ^TPO(DV,3) = definition of individual terms
100             ;     ^TPO(DV,9) = temporary storage for duplicate checking
110             ;
120             K ^TPO(DV,1),^TPO(DV,2),^TPO(DV,3),^TPO(DV,9) S ^TPO(DV)=-1
130             S (LN2,LN3)=0,(S2,ROOT)=""
140             ;
150             ; Set-up translation table
160             S X="0,1,2,3,4,5,6,7,8,9,+,=,<,>,;,:,/",Y="ZERO,ONE,TWO,THREE,FOUR,FIVE,SIX,SEVEN,EIGHT,NINE,PLUS,EQUAL TO,LESS THA
                N,GREATER THAN,SEMICOLON,COLON,_",KEYX="'"_QT_"\",KEYY="[]#"
170             F FX=1:1:17 S FXTBL($P(X,CM,FX))=$P(Y,CM,FX)
180             ;
190             ; First, process user-defined default result
200             S DSC="DEFAULT",K=^LBI(71,FNM,0,"DKY") D ADDK
210             S DSC="RANGE",K=^LBI(71,FNM,0,"QKY") D ADDK
220             ;
230             S K="" F Z=0:0 S K=$O(^LBI(71,FNM,1,K)) Q:K=""  I $L(K)=1 S DSC=$P(^(K),D1,1) S:$D(^LBI(4,DSC)) DSC=$P(^LBI(4,DSC),
                ...
240             ;
250             ; Second, process user-defined test keys, with secondary result keys
260             S K="" F Z=0:0 S K=$O(^LBI(71,FNM,2,K)) Q:K=""  I $L(K)=1 S DSC=$P(^(K),D1,1) S:$D(^LBI(1,DSC)) DSC=$P(^LBI(1,DSC),
                D1,2) D ADDK I $D(^LBI(71,FNM,2,K))=11 D ADDRK
270             ;
280             ; Third, process all implicit terms
290             S DSC="" F Z=0:0 S DSC=$O(^LBI(71,1,DSC)) Q:DSC=""  S K=$P(^(DSC),D1,1),XDSC=DSC D ADDK S DSC=XDSC
300             I S2'="" S LN2=LN2+1,^TPO(DV,2,LN2)="T"_LN2_"="_S2_";",S2="",ROOT=ROOT_"T"_LN2_CM
310             S $E(ROOT,1,($L(ROOT)-1))_";",^TPO(DV,1,1)="ROOT="_ROOT
320             ;
330             ; Fourth, process all miscellaneous commands that should be added to
340             ;       source file
350             S K="" F Z=0:0 S K=$O(^LBI(71,2,K)) Q:K=""  S LN3=LN3+1,^TPO(DV,3,LN3)=^(K)
360             ;
370             ; Put all the lines under the ^TPO(DV,1) node for Kermit
380             S K="" F Z=Z:1 S K=$O(^TPO(DV,2,K)) Q:K=""  S ^TPO(DV,1,Z)=^TPO(DV,2,K)
390             S K="" F Z=Z:1 S K=$O(^TPO(DV,3,K)) Q:K=""  S ^TPO(DV,1,Z)=^TPO(DV,3,K)
400             S ^TPO(DV,1,Z)="/*ADIOS*/"
410             ;
420             S ^TPO(DV,0,1)=TC_D1_FNM
430             ;
440             Q
450             ;
460     ADDK    ;
470             ; Add keys to source file
480             ;
490             ; Translate special characters
500             S DSC=$$SFIX(DSC)
510             ;
520             ; duplicate definition
530             Q:$D(^TPO(DV,9,DSC))
540             ;
550             ; ... ("_K,KEYY[K:"#"_K,1:K)
560             ;
570             ; Check length of the current hierarchy term definition to see
580             ; if you should start a new one
590             I $L(S2_CM_DSC)>70 S LN2=LN2+1,^TPO(DV,2,LN2)="T"_LN2_"="_S2_";",S2="",ROOT=ROOT_"T"_LN2_CM
600             ;
610             ; Add key to hierarchy term
620             S:$L(S2)>0 S2=S2_CM S S2=S2_DSC
630             ;
640             ; Add individual key definition to source file
650             S LN3=LN3+1,^TPO(DV,3,LN3)=DSC_"  "_QT_KX_QT_";"
660             ;
670             ; Set-up ^TPO(DV,9) for duplication checking
680             S ^TPO(DV,9,DSC)=""
690             ;
700             Q
710             ;
720     ADDRK   ;
730             ; Add keys to source file
```

```
740   ;
750        S KX="" F ZZ=0:0 S KK=$O(^LBI(71,FNM,2,K,KK)) Q:KK="" S RDSC=$P(^(KK),D1,1),RDSC=$S($D(^LBI(4,RDSC)):$P(^LBI(4,RDS
           C),D1,1),1:RDSC) D ADDRK1
760   c
770   ;
780        ; translate special characters
800        S RDSC=$$FIX(RDSC)
810   ;
820        ; Check for duplicate definition
830        Q:$D(^TPO(DV,9,RDSC))
840   ;
850        S KX=$S(KEYX[KK:"\"_KK,KEYY[KK:"#"_KK,1:KK)
860   ;
870             ; the length of the current hierarchy term definition to see
880             ; if you should start a new one
890        I $L(S2_CM_RDSC)>70 S LN2=LN2+1,^TPO(DV,2,LN2)="T"_LN2_"="_S2_";",S2="",ROOT=ROOT_"T"_LN2_CM
900   ;
910        ; Add key to hierarchy term
920        S:$L(S2)>0 S2=S2_CM S S2=S2_RDSC
930   ;
940        ; Add individual key definition to source file
950        S LN3=LN3+1,^TPO(DV,3,LN3)=RDSC_" "_QT_KX_QT_";"
960   ;
970        ; Set-up ^TPO(DV,9) for duplication checking
980        S ^TPO(DV,9,RDSC)=""
990   c
1000  ;
1010  FIX(X) ;
1020       ; Replace numbers and some symbols
1030       S Y="" F FX=1:1:$L(X) S Z=$E(X,FX),Y=$S($D(FXTBL(Z)):Y_" "_FXTBL(Z),1:Y_Z)
1040       ; Remove leading spaces
1050       ; F FX=1:1:$L(X) Q:$E(X,1)'=" " S X=$E(X,2,$L(X))
1060       ; Delete trailing spaces
1070       ; F (X):-1:1 Q:$E(X,FX)'=" " S X=$E(X,1,(FX-1))
1080       ; … spaces in the middle
1090       S Y="" F FX=1:1:$L(X) S Z=$E(X,FX),ZZ=Z_$E(X,FX+1),Y=$S(ZZ=" ":Y,1:Y_Z)
1100       ; Replace blanks with underscores & apostrophes with dashs
1110       ; …
1120       ; … y the first 39 characters because that's all VoiceScribe can handle
1130       ; … 1,39)
1140  ;
1150       Q Y
1160  ;
1170  COF  ;
1180       ; Construct object & voiceprint files
1190       ; The files will be built in ^TPO(DV):
1200       ;   ^TPO(DV,2) = object file
1210       ;   ^TPO(DV,3) = voiceprint file
1220  ;
1230       K ^TPO(DV,2),^TPO(DV,3) S ^TPO(DV)=-1
1240       S I1="",I2=2 F Z=0:0 S I1=$O(^LBI(71,FNM,3,TC,I1)) Q:I1="" S ^TPO(DV,I2,I1)=^(I1),XI1=I1 I ^(I1)["ADIOS" S I2=3
1250       ;
1260       S ^TPO(DV,0,1)=TC_D1_FNM
1270  ;
1280  c
```

What is claimed is:

1. An automatic speech recognition management system in a computer system including a speech recognition station and first storing means for storing an application program having an uncompiled vocabulary file of acceptable input words and corresponding characters associated with the input words, the automatic speech recognition management system comprising in combination:

(a) means for entering an operator identifier corresponding to a particular operator;

(b) means for executing the application program in response to the operator identifier to retrieve the uncompiled vocabulary file and corresponding characters;

(c) means for assembling the retrieved uncompiled vocabulary file and corresponding characters into a syntax file according to syntax rules of a speech recognition program associated with the speech recognition station;

(d) means associated with the speech recognition station for compiling the syntax file by means of a compiler associated with the speech recognition program to produce a compiled vocabulary file corresponding to the operator identifier and including the input words and corresponding character codes selected from a character code list;

(e) means for operating on the compiled vocabulary file to prompt an operator to speak the input words;

(f) analog-to-digital conversion circuit means for producing a digital signal representing the spoken input words;

(g) means responsive to the digital signal for producing therefrom a speech template file containing digital template codes corresponding to the input words;

(h) second storing means associated with the application program for storing the compiled vocabulary file and the speech template file;

(i) means for transmitting the compiled vocabulary file and the speech template file to the second storing means; and (j) means for downloading the compiled vocabulary file and the speech template file from the second storing means to the speech recognition program in response to the operator identifier to enable the operator to speak words of the compiled vocabulary file to effectuate execution of the application program.

2. An automatic speech recognition management system in a computer system including a speech recognition station and first storing means for storing a plurality of application programs each having an uncompiled vocabulary file of acceptable input words and corresponding characters associated with the input words, the automatic speech recognition management system comprising in combination:

(a) means for entering an operator identifier corresponding to a particular operator and an application program identifier into the computer system;

(b) means for retrieving the uncompiled vocabulary file and corresponding characters of an application program selected by the entered application program identifier;

(c) means for assembling the retrieved uncompiled vocabulary file and corresponding characters into a syntax file according to syntax rules of a speech recognition program associated with the speech recognition station;

(d) means associated with the speech recognition station for compiling the syntax file by means of a compiler associated with the speech recognition program to produce a compiled vocabulary file including the input words and a plurality of character codes selected from a character code list, the character codes corresponding, respectively, to the characters;

(e) means for operating on the compiled vocabulary file to prompt the operator to speak the input words;

(f) an analog-to-digital conversion circuit producing a digital signal representing the spoken input words;

(g) means responsive to the digital signal for producing therefrom a speech template file associated with the operator identifier and containing digital template codes corresponding to the input words, respectively;

(h) means for transmitting the compiled vocabulary file and the speech template file to the application program;

(i) second storing means for storing the compiled vocabulary file and the speech template file received from the transmitting means; and (j) means for downloading the compiled vocabulary file and the speech template file to the speech recognition program in response to the operator identifier and the application program identifier, to enable the operator to speak words of the compiled vocabulary file to effectuate execution of the application program.

3. The automatic speech recognition management system of claim 2 wherein the computer system includes a host computer, and the host computer includes the first storing means.

4. The automatic speech recognition management system of claim 3 wherein the speech recognition station includes a personal computer coupled to the host computer, the entering means including a keyboard included in the personal computer.

5. The automatic speech recognition management system of claim 4 wherein the speech recognition program is stored in the personal computer.

6. The automatic speech recognition management system of claim 4 wherein the characters are keystroke characters associated with the keyboard.

7. The automatic speech recognition management system of claim 2 including means for testing a vocabulary update flag associated with the application program to determine if the vocabulary file and corresponding characters have been updated, the transmitting means transmitting the compiled vocabulary file and speech template file to the speech recognition program if the vocabulary file and corresponding characters have not been updated.

8. The automatic speech recognition management system of claim 7 including means for testing an operator enrollment flag associated with the application program to determine if the operator has been enrolled for the application program since a most recent update of the vocabulary file thereof.

9. The automatic speech recognition management system of claim 7 wherein the assembling means includes means for setting up a software structure for entry of a plurality of uncompiled input words and corresponding keystroke characters and means for sequentially entering the uncompiled input words and associated characters into the software structure according to syntax rules of the speech recognition program.

10. An automatic speech recognition management system in a computer system including a speech recognition station and means for storing an application program having an uncompiled vocabulary file of acceptable input words and corresponding characters associated with the input words, the automatic speech recognition management system comprising in combination:

(a) means for entering an operator identifier corresponding to a particular operator;

(b) means for executing the application program to retrieve the uncompiled vocabulary file and corresponding characters;

(c) means for assembling the retrieved uncompiled vocabulary file and corresponding characters into a syntax file according to syntax rules of a speech recognition program associated with the speech recognition station;

(d) means associated with the speech recognition station for compiling the syntax file by means of a compiler associated with the speech recognition program to produce a compiled vocabulary file corresponding to the operator identifier and including the input words and corresponding character codes selected from a character code list;

(e) means for operating on the compiled vocabulary file to prompt an operator to speak the input words;

(f) analog-to-digital conversion circuit means for producing digital signals representing input words spoken by the operator;

(g) means responsive to the digital signals for producing therefrom a speech template file containing digital template codes corresponding to the input words;

(h) means for operating on a digital signal produced in response to speaking of a word by the operator and on data of the speech template file and the compiled vocabulary file to select the character code that represents the word if the word is included in the compiled vocabulary file; and (i) means for transmitting the selected character code to the application program in response to the operator identifier to effectuate execution thereof.

11. In a computer system including a speech recognition station and means for entering operator identifiers and application program identifiers into the computer system, and means for storing a plurality of application programs each having an uncompiled vocabulary file of acceptable input words and corresponding characters associated with the input words, an automatic method of speech recognition management comprising the steps of:

(a) entering an operator identifier and an application program identifier into the computer system via the entering means;

(b) determining if a compiled vocabulary corresponding to the application program identifier exists, and if it does not exist, retrieving an uncompiled vocabulary file including input words and corresponding keystroke characters of an application program corresponding to the application program identifier and performing steps (c) and (d) before step (e);

(c) assembling the retrieved uncompiled vocabulary file and corresponding keystroke characters into a syntax file according to syntax rules of a speech recognition program stored in the computer system;

(d) compiling the syntax file by means of a compiler associated with the speech recognition program to produce a compiled vocabulary file corresponding to the entered application program identifier and including the input words of the application program and corresponding character codes selected from a character code list;

(e) using the compiled vocabulary file to prompt the operator to speak the various vocabulary words;

(f) producing a digital signal representing the spoken words by means of an analog-to-digital conversion circuit and producing therefrom a speech template file corresponding to the operator identifier and containing digital template codes corresponding to the input words of the compiled vocabulary file;

(g) transmitting the compiled vocabulary file and the speech template file to the application program and storing the compiled vocabulary file and the speech template file; and (h) downloading the compiled vocabulary file and the speech template file to the speech recognition program in response to the application program identifier and the operator identifier to enable the operator to speech-input spoken words of the compiled vocabulary file to effectuate execution of the application program.

12. The method of claim 11 including testing a vocabulary update flag associated with the application program to determine if the vocabulary file and corresponding characters have been updated before performing step (b).

13. The method of claim 12 including testing an operator enrollment flag associated with the application program to determine if an operator to which the operator identifier corresponds has been enrolled for the application program since a most recent update of the vocabulary file thereof before performing step (e).

14. An automatic speech recognition management system in a computer system including a plurality of speech recognition stations and means for storing a plurality of application programs each having a vocabulary file of acceptable input words, the automatic speech recognition management system comprising in combination:

(a) means for entering an application program identifier of a desired application program and an operator identifier of a particular person requesting access to the desired application program into one of the speech recognition stations;

(b) means responsive to the application program identifier for retrieving a first file of information uniquely associated with the desired application program;

(c) means responsive to the operator identifier for retrieving a second file of information uniquely associated with the requesting person;

(d) means for operating the computer system to use information from the first file to determine a plurality of words that need to be spoken by the particular person into the speech recognition station to effectuate desired execution of the desired application program; and (e) means for operating the computer system to use information from the second file to automatically augment recognition of the plurality of words spoken into the speech recognition station by the particular person.

15. An automatic speech recognition management system in a computer system including a speech recognition station, a first portion of the computer system storing a plurality of application programs each having an uncompiled vocabulary file of acceptable input words and corresponding characters associated with the input words, the automatic speech recognition management system comprising in combination:

(a) an input device for entering an operator identifier corresponding to a particular operator and an application program identifier into the computer system;

(b) a second portion of the computer system retrieving the uncompiled vocabulary file and corresponding characters of an application program selected by the entered application program identifier;

(c) a third portion of the computer system assembling the retrieved uncompiled vocabulary file and corresponding characters into a syntax file according to syntax rules of a speech recognition program associated with the speech recognition station;

(d) a first portion of the speech recognition station configured to compile the syntax file by means of a compiler associated with the speech recognition program to produce a compiled vocabulary file including the input words and a plurality of character codes selected from a character code list, the character codes corresponding, respectively, to the characters;

(e) a second portion of the speech recognition station operating on the compiled vocabulary file to prompt the operator to speak various input words;

(f) an analog-to-digital conversion circuit producing a digital signal representing the spoken input words;

(g) a third portion of the speech recognition station responsive to the digital signal producing therefrom a speech template file associated with the operator identifier and containing digital template codes corresponding to the input words, respectively;

(h) a fourth portion of the speech recognition station transmitting the compiled vocabulary file and the speech template file to the application program;

(i) a fourth portion of the computer system storing the compiled vocabulary file and the speech template file received from the fourth portion of the speech recognition station; and (j) a fifth portion of the computer system downloading the compiled vocabulary file and the speech template file to the speech recognition program in response to the operator identifier and the application program identifier, to enable the operator to speak words of the compiled vocabulary file to effectuate execution of the application program.

16. In a computer system including a speech recognition station and an input device for entering operator identifiers and application program identifiers into the computer system, the computer system storing a plurality of application programs each having an uncompiled vocabulary file of acceptable input words and corresponding characters associated with the input words, an automatic method of speech recognition management comprising the steps of:

(a) entering an operator identifier and an application program identifier into the computer system;

(b) determining if a compiled vocabulary corresponding to the application program identifier exists, and if it does not exist, retrieving an uncompiled vocabulary file including input words and corresponding keystroke characters of an application program corresponding to the application program identifier and performing steps (c) and (d) before step (e);

(c) assembling the retrieved uncompiled vocabulary file and corresponding keystroke characters into a syntax file according to syntax rules of a speech recognition program stored in the computer system;

(d) compiling the syntax file by means of a compiler associated with the speech recognition program to produce a compiled vocabulary file corresponding to the entered application program identifier and including the input words of the application program and corresponding character codes selected from a character code list;

(e) using the compiled vocabulary file to prompt the operator to speak the various vocabulary words;

(f) producing a digital signal representing the spoken words by means of an analog-to-digital conversion circuit and producing therefrom a speech template file corresponding to the operator identifier and containing digital template codes corresponding to various input words of the compiled vocabulary file;

(g) transmitting the compiled vocabulary file and the speech template file to the application program and storing the compiled vocabulary file and the speech template file; and (h) downloading the compiled vocabulary file and the speech template file to the speech recognition program in response to the application program identifier and the operator identifier to enable the operator to speech-input spoken words of the compiled vocabulary file to effectuate execution of the application program.

17. An automatic speech recognition management system in a computer system including a speech recognition station, the computer system storing a plurality of application programs each having a vocabulary file of acceptable input words, the automatic speech recognition management system comprising in combination:

(a) an input device for entering an application program identifier of a desired application program and an operator identifier of a particular person requesting access to the desired application program into the speech recognition station;

(b) a first portion of the computer system retrieving a first file of information uniquely associated with the desired application program in response to the application program identifier;

(c) a second portion of the computer system retrieving a second file of information uniquely associated with the requesting person in response to the operator identifier;

(d) a third portion of the computer system using information from the first file to assemble, according to rules of the speech recognition station, a plurality of words that need to be spoken by the particular person into the speech recognition station to effectuate desired execution of the desired application program; and (e) a fourth portion of the computer system using information from the second file to automatically augment recognition of the plurality of words spoken into the speech recognition station by the particular person.

18. An automatic speech recognition management system in a computer system including a speech recognition station, a first portion of the computer system storing a plurality of application programs each having a vocabulary file of acceptable input words and corresponding characters associated with the input words, the automatic speech recognition management system comprising in combination:

(a) an input device for entering an operator identifier corresponding to a particular operator and an application program identifier into the computer system;

(b) a second portion of the computer system retrieving the vocabulary file and corresponding characters of an application program selected by the entered application program identifier;

(c) a third portion of the computer system assembling the retrieved vocabulary file and corresponding characters into a software language modeling structure according to language modeling rules of a speech recognition program associated with the speech recognition station;

(d) a first portion of the speech recognition station operating on the software language modeling structure to prompt the operator to speak various input words;

(e) an analog-to-digital conversion circuit producing a digital signal representing the spoken input words;

(f) a second portion of the speech recognition station responsive to the digital signal producing therefrom phonetic information associated with the operator identifier;

(g) a third portion of the speech recognition station transmitting the software language modeling structure and the phonetic information to the application program;

(h) a fourth portion of the computer system storing the software language modeling structure and the phonetic information received from the third portion of the speech recogniton station; and (i) a fifth portion of the computer system downloading the software language modeling structure and the phonetic information to the speech recognition program in response to the operator identifier and the application program identifier, to enable the operator to speak words of the vocabulary file to effectuate execution of the application program.

19. An automatic speech recognition management system in a computer system including a speech recognition station, a first portion of the computer system storing a plurality of application programs each having a vocabulary file of acceptable input words and corresponding characters associated with the input words, the automatic speech recognition management system comprising in combination:

(a) an input device for entering an application program identifier into the computer system;

(b) a second portion of the computer system retrieving the vocabulary file and corresponding characters of an application program selected by the entered application program identifier;

(c) a third portion of the computer system assembling the retrieved vocabulary file and corresponding characters into a software language modeling structure according to language modeling rules of a speech recognition program associated with the speech recognition station;

(d) a first portion of the speech recognition station operating on the software language modeling structure to prompt an operator to speak various input words;

(e) an analog-to-digital conversion circuit producing a digital signal representing the spoken input words;

(f) a second portion of the speech recognition station responsive to the digital signal producing therefrom phonetic information;

(g) a third portion of the speech recognition station transmitting the software language modeling structure and the phonetic information to the application program;

(h) a fourth portion of the computer system storing the software language modeling structure and the phonetic information received from the third portion of the speech recognition station; and (i) a fifth portion of the computer system downloading the software language modeling structure and the phonetic information to the speech recognition program in response to the application program identifier, to enable the operator to speak words of the vocabulary file to effectuate execution of the application program.

* * * * *